(12) United States Patent
Kawasaki et al.

(10) Patent No.: US 7,653,869 B2
(45) Date of Patent: Jan. 26, 2010

(54) SYSTEM AND METHOD FOR ERROR CORRECTION IN HIGH DEFINITION TV SIGNAL

(75) Inventors: Kenichi Kawasaki, San Diego, CA (US); Ryuichi Iwamura, San Deigo, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 708 days.

(21) Appl. No.: 11/062,142

(22) Filed: Feb. 18, 2005

(65) Prior Publication Data

US 2006/0190803 A1 Aug. 24, 2006

(51) Int. Cl.
*H03M 13/00* (2006.01)

(52) U.S. Cl. .................. 714/821; 386/46; 375/261; 715/767; 715/823

(58) Field of Classification Search .................. 715/821; 714/821
See application file for complete search history.

(56) References Cited

U.S. PATENT DOCUMENTS

| | | | | |
|---|---|---|---|---|
| 5,309,477 A | * | 5/1994 | Ishii | 375/224 |
| 5,566,208 A | * | 10/1996 | Balakrishnan | 375/240 |
| 5,592,471 A | * | 1/1997 | Briskman | 455/506 |
| 5,663,726 A | * | 9/1997 | Bakhmutsky | 341/67 |
| 6,070,141 A | * | 5/2000 | Houvener et al. | 705/1 |
| 6,263,023 B1 | * | 7/2001 | Ngai | 375/240.12 |
| 6,594,798 B1 | | 7/2003 | Chou et al. | 714/820 |
| 6,728,924 B1 | * | 4/2004 | Lou et al. | 714/776 |
| 7,127,669 B2 | | 10/2006 | Platenberg et al. | 714/820 |
| 7,248,158 B2 | * | 7/2007 | Berkman et al. | 340/538 |
| 7,296,211 B2 | * | 11/2007 | Cole et al. | 714/776 |
| RE40,936 E | * | 10/2009 | Oshima | 386/46 |
| 2001/0006535 A1 | | 7/2001 | Csomo | 375/240.27 |
| 2004/0120404 A1 | * | 6/2004 | Sugahara et al. | 375/240.23 |
| 2004/0139477 A1 | * | 7/2004 | Russell et al. | 725/126 |
| 2004/0194008 A1 | | 9/2004 | Garudadri et al. | 714/821 |
| 2006/0171373 A1 | * | 8/2006 | Li | 370/352 |

* cited by examiner

*Primary Examiner*—M. Mujtaba K Chaudry
*Assistant Examiner*—Enam Ahmed
(74) *Attorney, Agent, or Firm*—John L. Rogitz

(57) ABSTRACT

An input signal such as a HDTV signal is split into a primary signal, which can be decoded if desired, and an secondary signal, which can remain compressed. The primary signal may be delayed and then both signals are transmitted to a receiver. If no error in the primary signal is detected, the primary signal is used to display data. Otherwise, the secondary signal, which arrives before the primary signal and consequently which is available for substitution, is displayed.

4 Claims, 7 Drawing Sheets

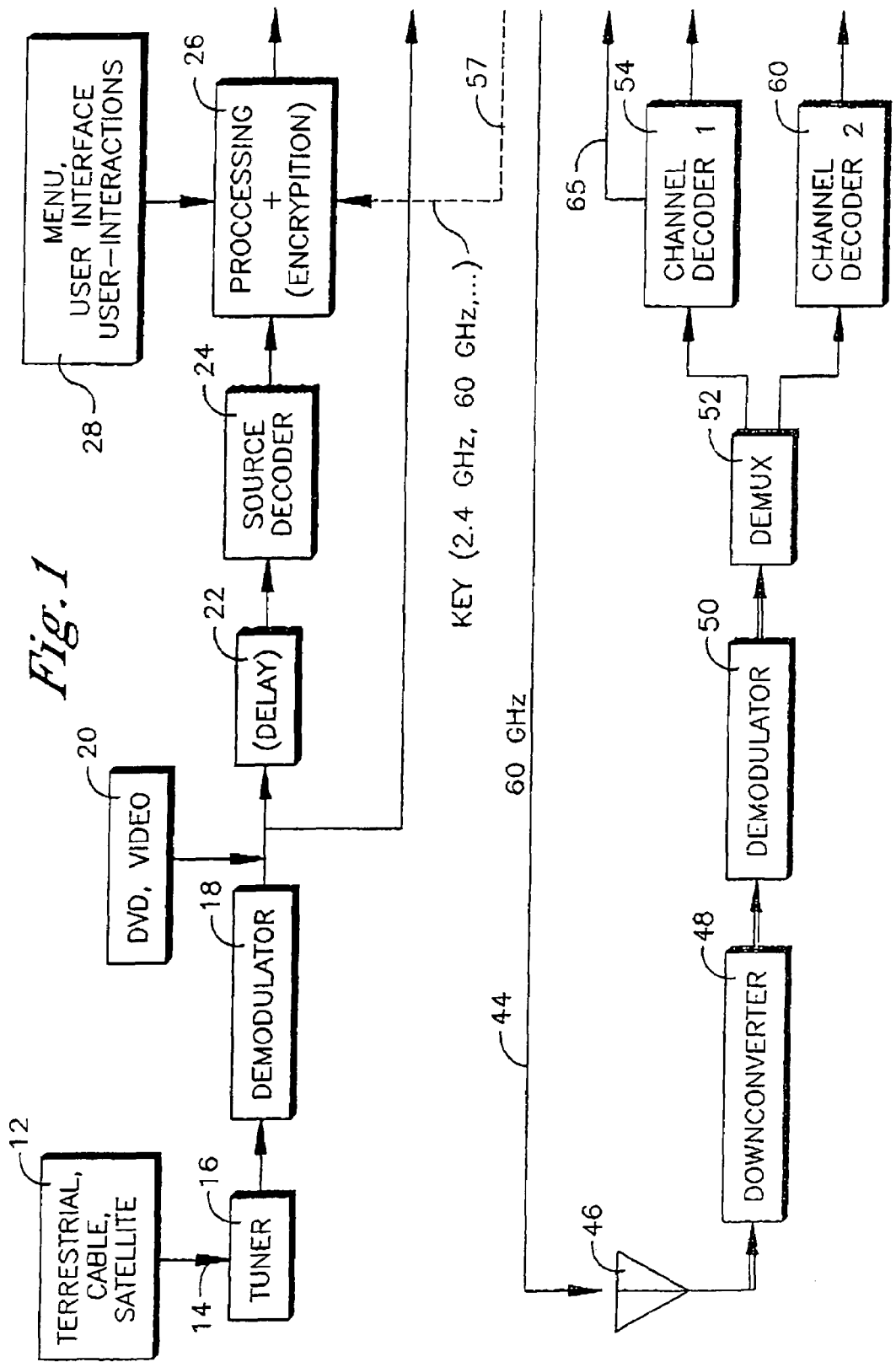

SERVER BLOCK DIAGRAM

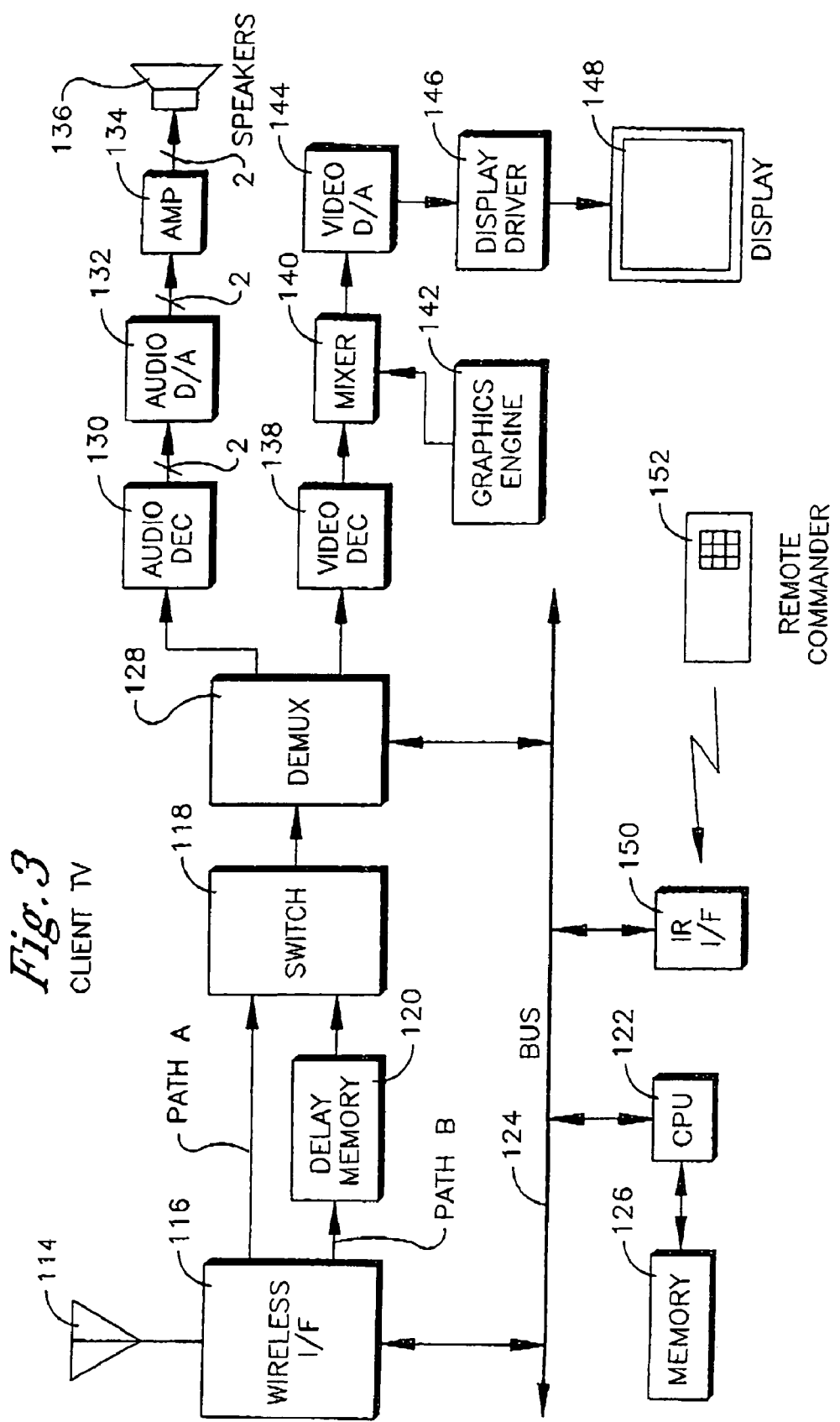

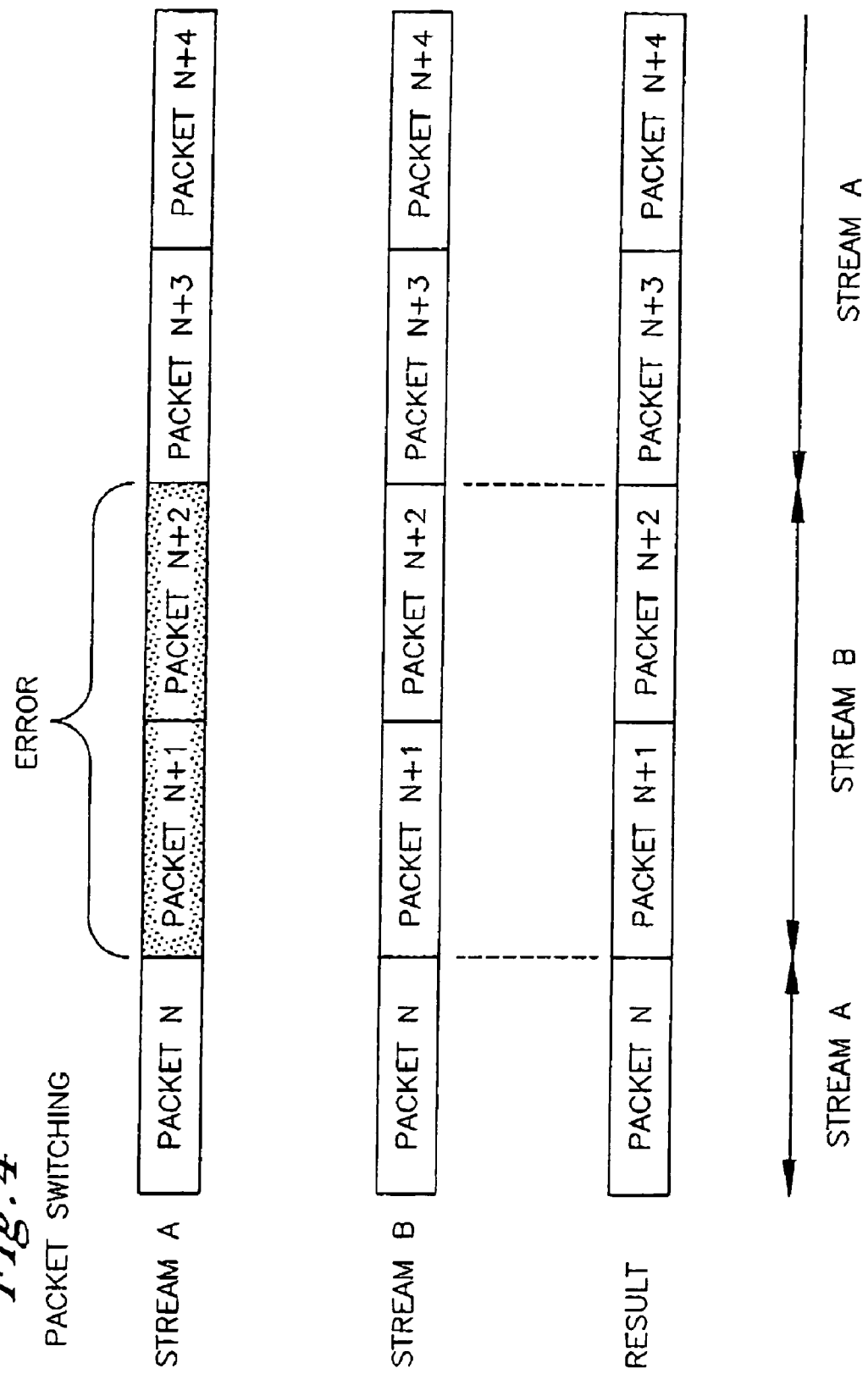

PACKET SWITCHING

SYSTEM AND METHOD FOR ERROR CORRECTION IN HIGH DEFINITION TV SIGNAL

FIELD OF THE INVENTION

The present invention relates generally to error correction, and in particular to error correction in high definition (HD) TV signals.

BACKGROUND OF THE INVENTION

Error correction of source signals is a fertile field. In particular, error correction of digital data such as wirelessly transmitted information including but not limited to high definition (HD) TV signals is of interest, because data can be lost or corrupted in transmission. For instance, for short range transmission of HDTV using, e.g., the 60 GHz unlicensed frequency band, if a person walks between the transmitter and receiver, data can be momentarily lost. The present invention is directed to an improved method for error correction that is particularly though not exclusively useful for error correction in wirelessly transmitted HDTV signals.

SUMMARY OF THE INVENTION

A system for error correction in a source signal includes a source signal input and a first path from the input. In the first path the source signal is decoded and sent to a first encoder for generating a primary signal stream. A second path extends from the input and includes a second encoder for generating an encoded compressed signal stream. A multiplexer combines the encoded compressed signal stream with the primary signal stream for transmission. In this way, lost data in the primary signal stream can be replaced by information in the encoded compressed signal stream.

The source signal may be a high definition (HD) TV signal, and the data can be transmitted in a spectrum between about 57 GHz and 64 GHz.

As set forth further below, a delay can be provided in the first path for delaying encoding of decoded source signal data relative to the encoding of a compressed version of the same source signal data in the second path. The system may also include a receiver receiving signals sent by the transmitter. The receiver can include a demultiplexer separating the primary signal stream from the encoded compressed signal stream, and circuitry processing the streams. The receiver may also have logic for displaying information carried in the primary signal stream under a first error condition and otherwise displaying information carried in the encoded compressed stream.

In another aspect, a method for displaying data includes transmitting first and second versions of the data to a receiver. The method also includes displaying information carried in the first version until errors above a threshold are detected in the first version, at which point information carried in the second version is displayed.

In still another aspect, a receiver of wirelessly transmitted data to be displayed includes radio signal processing components for processing signals representing the data to be displayed. The signals include a first signal representing the data to be displayed and a second signal representing the data to be displayed. A delay component temporarily holds the first signal. Logic is provided to the receiver for determining whether the first signal violates an error condition, and if so, substituting information carried in the second signal for information affected by error in the first signal.

BRIEF DESCRIPTION OF THE DRAWINGS

The details of the present invention, both as to its structure and operation, can best be understood in reference to the accompanying drawings, in which like reference numerals refer to like parts, and in which:

FIG. 3 is a block diagram of the receiver of the data from the non-limiting transmitter shown in FIG. 2;

DETAILED DESCRIPTION OF THE PREFERRED EMBODIMENTS

In the preferred non-limiting embodiment shown, the processors described herein may access one or more software or hardware elements to undertake the present logic. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device. The logic can be embodied in electronic circuitry.

Figure 1:
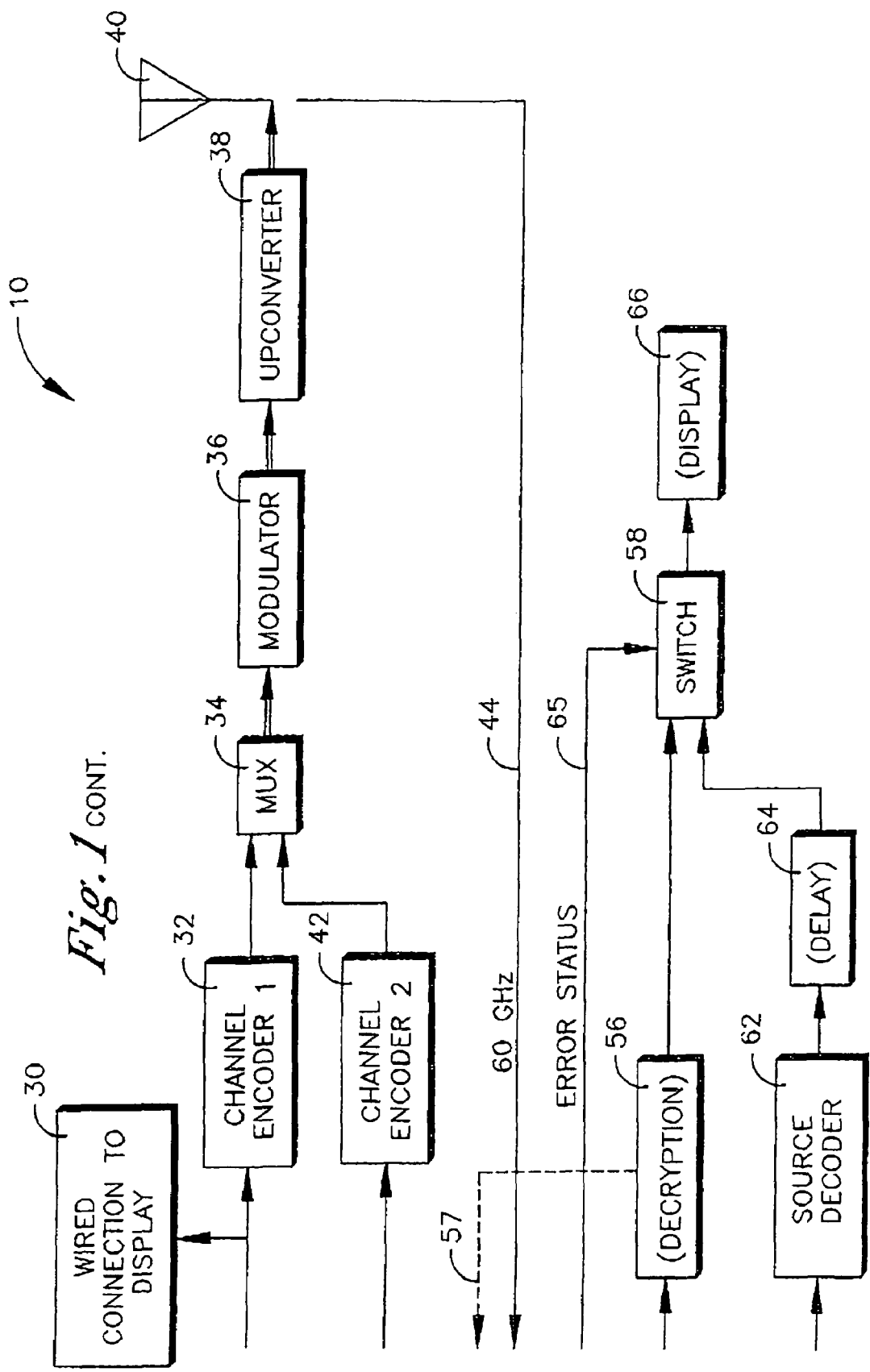
FIG. 1 is a block diagram of a non-limiting system according to the present invention.

Referring initially to FIG. 1, a system is shown, generally designated 10, in which a compressed signal such as but not limited to a HDTV signal is sent from a source 12, such as but not limited to a terrestrial, cable, or satellite TV source. When the source signal is a TV signal, the system 10 may be a TV system contained in a single housing or set-top box, and the source signal can be provided at a source signal input 14 that is established by the input to a TV tuner 16 to select one of a plurality of channels. The output of the tuner 16 is sent to a demodulator 18 to demodulate the signal in accordance with principles known in the art. As shown in FIG. 1, in some embodiments signals from an auxiliary source 20 such as a DVD player or video player also may be provided in addition to the demodulated TV signal.

In accordance with the present invention, the source signal is split into first and second signal paths, with a first path being a decoded signal path that in some embodiments may include a delay 22 for delaying the signal temporarily as set forth further below prior to sending the signal to a source decoder 24. The source decoder 24 decodes the signal in accordance with, e.g., MPEG principles known in the art to output a decoded (uncompressed) source signal that, if desired, can be processed by, e.g., encrypting it in a processing and encryption module 26 that can be established by, e.g., a processor inside a TV. While the preferred embodiment uses the decoded signal as the primary signal because it represents higher resolution than the compressed signal discussed further below, in other embodiments the compressed signal can be designated the primary signal. Still further, while the example shown in FIG. 1 uses one compressed and one decoded signal owing to the large bandwidth provided by the non-limiting 60 GHz band, both the primary and secondary signals may remain compressed if desired.

The processing and encryption module 26 may also receive ancillary information such as menu information, user interface information, and user interactions from an ancillary source 28 for combining menus, etc. with the video in the source signal in accordance with TV principles known in the art.

Continuing with the description of the first signal path, the output of the processing module 26 may be provided over, e.g., a wire for presentation on a display 30. It additionally may be desired to wirelessly send the source signal to another device along a high bandwidth path. Accordingly, the output of the processing module 26 can be sent to a first channel encoder 32, for encoding the signal for transmission in accordance with encoding principles known in the art. The encoded signal in the first path is sent to a multiplexer 34 for operation to be shortly disclosed, and then to transmission circuitry for transmission. The transmission circuitry may include a modulator 36, an upconverter 38, and an antenna 40 in accordance with wireless transmission principles known in the art. In one non-limiting embodiment, the transmission circuitry transmits data in the 60 GHz band, i.e., at one or more frequencies between about 57 GHz and 64 GHz. Infrared or other types of high bandwidth transmission paradigms may also be used.

As mentioned above, the source signal after processing by the demodulator 18 is sent along first and second signal paths, with the first signal path having been described above and with the second signal path, as shown in FIG. 1, including a second encoder 42. The second encoder 42 encodes the already-compressed source signal and sends it to the multiplexer 34, which multiplexes the signal from the second path with the signal from the first path. It is to be understood that the encoders 32, 42 shown in FIG. 1 are system 10 encoders that function in addition to and separately from encoding that is originally applied in the source 12, so that the second path encodes a version of the source signal that itself has not been previously decoded from its demodulated compressed state. In any case, it may now be appreciated that the system 10 shown in FIG. 1 transmits two versions of the source signal received at the input 14, namely, a compressed error correction version and a decoded primary version, for purposes to be shortly disclosed.

FIG. 1 shows that the combined compressed (error correction) and decoded (primary) versions of the source signal are transmitted along a path 44 to a receiver antenna 46. The path 44 may be a short range, directional, line of sight 60 GHz path, although as mentioned above systems other than 60 GHz systems may be used. The received signal is processed in accordance with principles known in the art by a downconverter 48, demodulator 50, and then the two versions of the signal (compressed and decoded) are separated from each other at a demultiplexer 52. The primary (decoded) signal is sent to a first channel decoder 54 for processing in reverse to that applied by the first encoder 32. If the signal had been encrypted, it is decrypted at a decryption module 56. FIG. 1 indicates that a reverse channel 57 may be used to exchange encryption keys between the processing and encryption module 26 in the transmitter and the decryption module 56 in the receiver. The reverse channel 57 may be on the same frequency as the forward channel described above, or at a different frequency, e.g., 2.4 GHz. From the decryption module 56 (if decryption was necessary), the primary signal is sent to a switch 58, which may be implemented as a selector in accordance with disclosure below.

As was the case with the transmitter described above, the receiver shown in FIG. 1 has two signal paths. In addition to the first receiver signal path from the demultiplexer 52 set forth above, a second signal path includes a second decoder 60 for processing in reverse to that applied by the second encoder 42 in the transmitter shown in FIG. 1. Then, recalling that the secondary signal in the second path was never decoded in the transmitter from its original compression as received from the source 12, the secondary signal is processed through a source compression decoder 62, which performs the same decoding as the source decoder 24 in the first signal path of the transmitter.

Recall further that the primary signal may be delayed in time relative to the secondary signal because of the delay 22 in the first signal path of the transmitter. When such a delay is implemented, the secondary signal in the second signal path of the receiver is sent to a delay buffer 64 to delay it by the same temporal amount as the primary signal had been delayed in the transmitter, to realign, in time, the primary and secondary signals. In this way, a packet in the secondary signal having a particular packet ID can arrive substantially simultaneously at the switch 58 as its twin (having the same packet ID) in the primary signal could have arrived in the absence of errors in the primary signal. Note that because the secondary signal is compressed, the size of the delay buffer (which might store only a few seconds worth of data) need not be excessive.

The first channel decoder 54 or other component may detect errors in the primary signal in accordance with error detection principles known in the art, e.g., by examining parity bits. If an error threshold (which may be set at zero) is violated, the decoder 54 (or other component) may send a switching signal along an error status path 65 to the switch 58. When no errors (or errors below a threshold) are present in the primary signal, the switch 58 operates to pass the primary signal to a display 66 for presentation of, e.g., audio/video streams represented by the primary signal. It is to be understood that the display 66 may incorporate a digital to analog converter, or that a DAC may be interposed between the display 66 and the switch 58.

On the other hand, when an error is detected in the primary signal, the error status line signal causes the switch 58 to pass the secondary signal present at its input from the second signal path to the display 66. Thus, on the receiver end, the compressed signal that had been present at the output of the demodulator 18 and encoded by the second encoder 42 in the transmitter, and that is processed along the second path in the receiver as described above, can be used to compensate for errors in the primary signal by substituting out the corrupted portions of the data. Because the transmitter may transmit at 60 GHz, sufficient bandwidth is provided in the non-limiting implementation shown for both the HD signal and the compressed signal.

In addition, it may now be appreciated that the delay between the secondary signal and the primary signal can be used to compensate for short periods of signal blocking. Specifically, because packets in the secondary signal are received prior to their counterpart packets in the primary signal, the secondary signal can be used when the primary signal is blocked.

Figure 2:
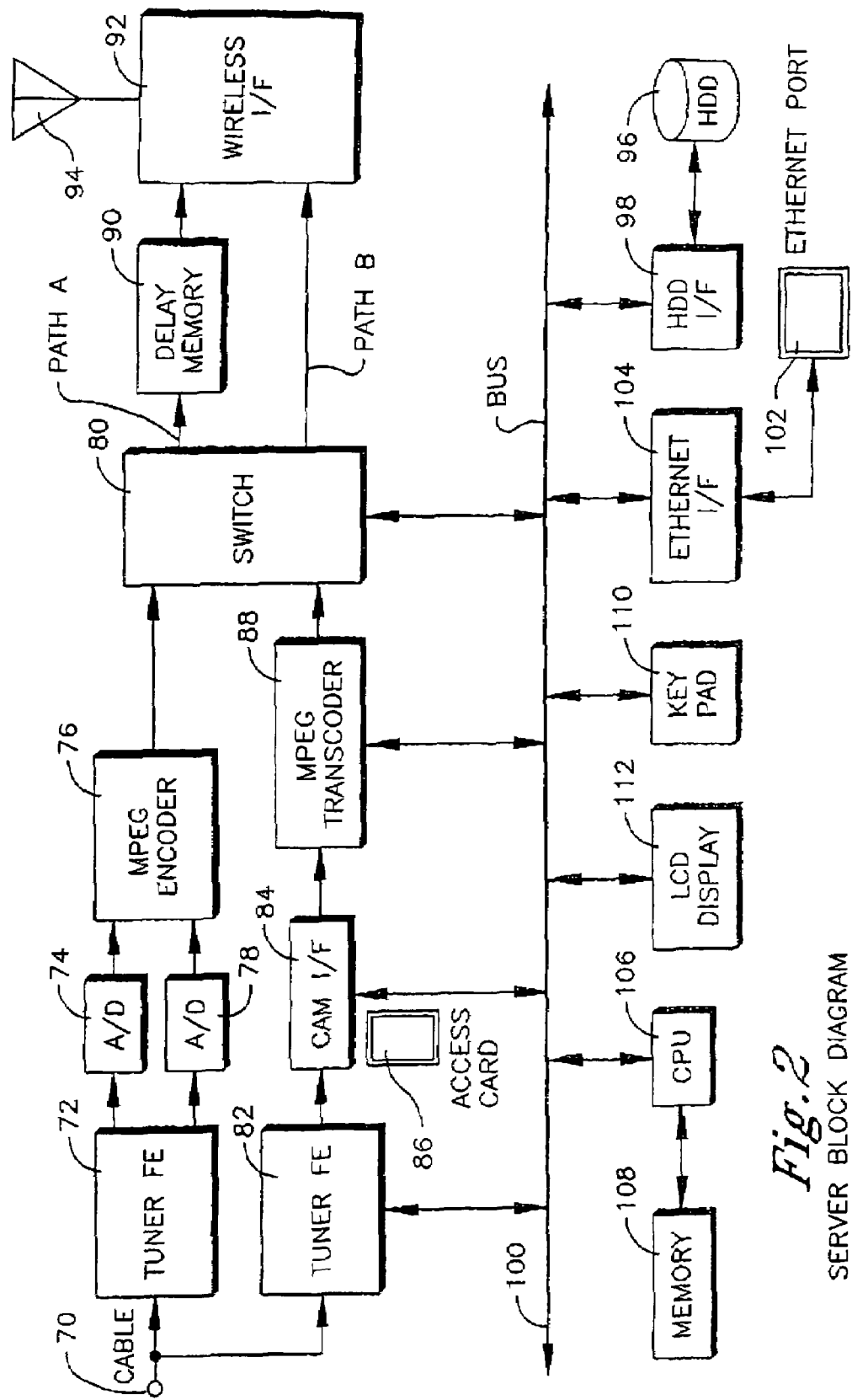
FIG. 2 is a block diagram of the transmitter of another non-limiting system according to the present invention.

FIGS. 2 and 3 respectively show the server and client TV in an alternate embodiment that may be used for, e.g., providing error correction in the case of signals such as standard television signals that may not necessarily be received in a compressed form. The server shown in FIG. 2, which may be implemented in a set-top box or TV chassis of a home entertainment system, can receive signals from a source such as but not limited to an analog cable source at a signal input 70. Analog signals can be tuned and demodulated in an analog tuner/front end component 72, the video output from which can be digitized in a digital analog-to-digital converter (ADC) 74 and then encoded in an MPEG encoder 76. Similarly, the audio output from the analog tuner/front end component 72 can be digitized in an audio ADC 78 and encoded in the MPEG encoder 76. In turn, the output stream from the MPEG encoder 76 can be sent to a switch 80.

For digital input signals, the signals may be tuned and demodulated in a digital tuner/front end 82, the output of which, if encrypted for content protection, is decrypted in a Conditional Access Module (CAM) Interface 84 in accordance with decryption information that may be received from, e.g., a portable hand-held access card 86. The decrypted digital stream may be transcoded at another rate if desired in an MPEG transcoder 88 and sent to the switch 80.

In accordance with present principles, the switch 80 outputs the relevant input stream (either original analog or original digital, depending on what had been received) to first and second signal paths, labelled "Path A" and "Path B" in FIG. 2. In essence, the switch 80 sends the same input packet along each of two paths to create two streams that are identical to each other. Because, unlike the case in FIG. 1, the two signal streams in FIG. 2 are identical, either one may arbitrarily be selected as the "primary" signal and the other designated the "error correction" signal.

The stream in the first path may be delayed temporarily by a delay 90. Thus, path "A" in the example shown represents the primary signal. A wireless transmission interface 92 receives the two streams and transmits them over an antenna 94 sent to a receiver such as the client TV shown in FIG. 3 and described further below. The wireless transmission interface 92, which may include a multiplexer, may be a 60 GHz transmitter or other transmitter.

In non-limiting implementations incoming streams may be recorded to, e.g., a hard disk drive (HDD) 96 through a HDD interface 98. As shown in FIG. 2, the incoming streams may be provided to the HDD 96 from the switch 80 or from the MPEG transcoder 88 via an internal data bus 100. For playback, the recorded stream is sent to the switch 80 and transmitted to a receiver. Also, the HDD 96 may store audio/video data downloaded from the Internet through a modem-compatible ethernet port 102 and ethernet interface 104. It is to be understood that a processor such as a CPU 106 that is connected to the bus 100 controls the components discussed above in accordance with logic that may be embodied in control software in, e.g., an internal solid state or disk memory 108. If desired, an input device such as a keypad 110 can be provided to send input data to the CPU 106 through the bus 100, while an output device such as an LCD display 112 can be used to indicate data sent from the CPU 106, for example, tuning status, network status, error messages, etc.

The signals from the server shown in FIG. 2 may be received by a receiver such as the client TV shown in FIG. 3. The signals are captured at an antenna 114 and processed in accordance with wireless principles known in the art by a wireless receiver interface 116, which outputs the two twin signal streams along first and second paths "A" and "B" that correspond to the "A" and "B" paths, respectively, shown in FIG. 2. The output signal representing the delayed stream (Path A) is sent to a switch 118, while the output signal of the non-delayed stream (Path B) is sent to a receiver delay memory 120 that has the same delay time length as the delay memory 90 in the server shown in FIG. 2. In turn, the output of the receiver delay memory 118 is sent to the switch 118.

Figure 4:
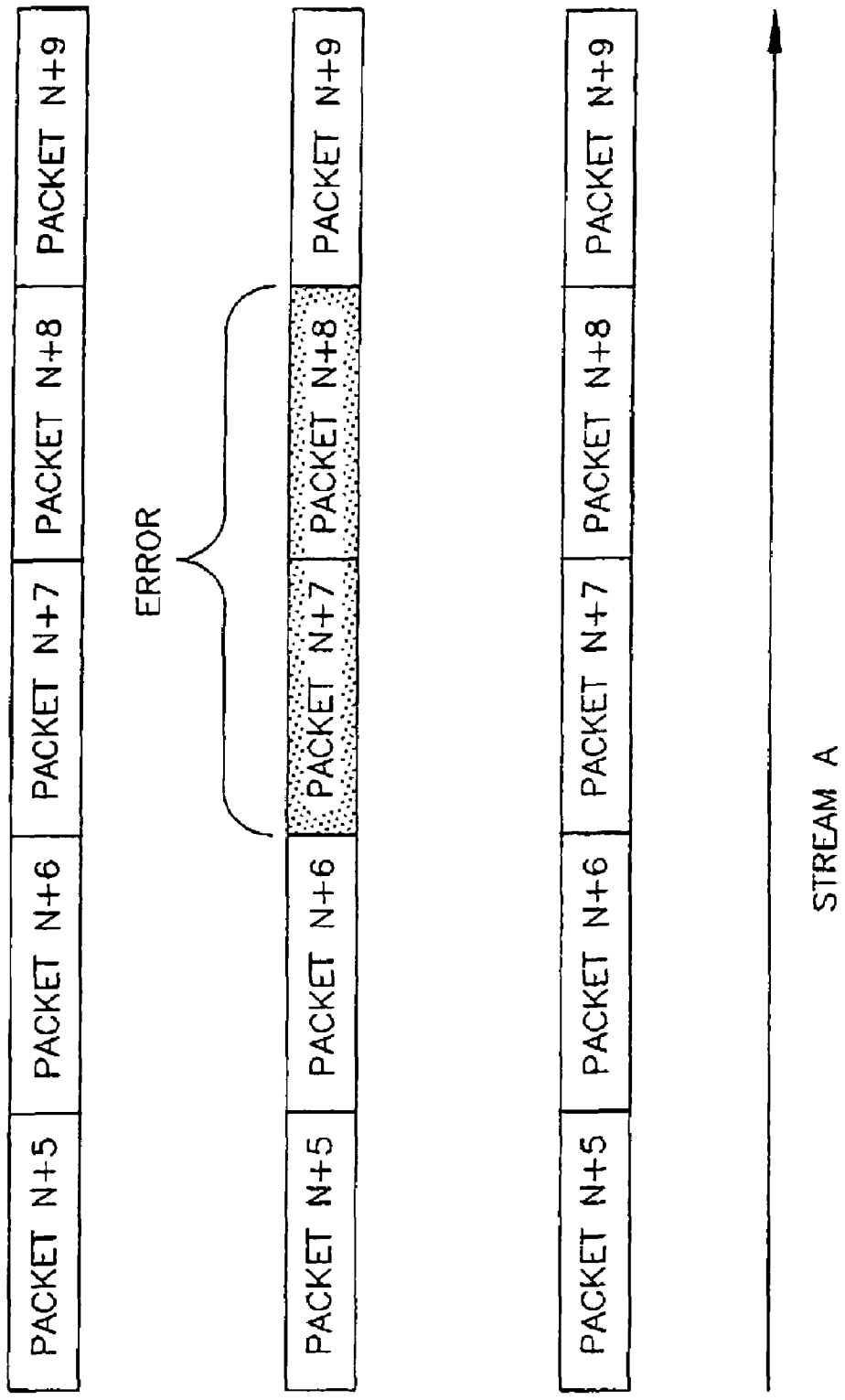
FIG. 4 is a schematic diagram showing how the system switches between streams in the presence of errors.

Accordingly, in the switch 118, the packet timing of both streams is identical. However, briefly referring to FIG. 4, erroneous packets caused by the intercept are different. Specifically, as illustrated in FIG. 4, each error-free packet in the stream in Path A is directly output, with an erroneous packet being replaced with the corresponding packet (packet with the same ID or timestamp) in the stream in Path B, which is error-free and hence which is output to render a complete, error free stream (labelled "result" in FIG. 4). Likewise, errors in packets (e.g., numbers N+7 and N+8 in FIG. 4) in the stream in path B do not affect the packets in the stream in path A.

The above stream selection is undertaken by the switch 118 under control of a processor such as a CPU 122 that is connected to the switch 118 over an internal bus 124. The CPU 122 may access a logic device such as a disk or solid state memory 126 that contains control software embodying the present logic, so that when an error is detected in accordance with error detection principles known in the art by, e.g., the CPU 122, the CPU 122 can cause the switch 118 to reconfigure to select, for output, the other stream.

The output of the switch 118 may be demultiplexed in a demultiplexer 128 to separate the audio from the video. The audio portion is sent to an audio decoder 130 for analogizing at a digital-to-analog converter (DAC) 132, amplification at an audio amplifier 134, and play on one or more speakers 136. On the other hand, the video portion is sent to a video decoder 138 for decoding, then, if desired, to a mixer 140 for mixing with graphics data generated in a graphics engine 142. The video is then analogized in a video DAC 144 and sent to a display driver 146, for display on a monitor 148.

It is to be understood that the server CPU and receiver CPU can exchange asynchronous data (commands, data, etc.) over the wireless network shown in FIGS. 2 and 3. It is to be further understood that the receiver CPU 122 can control various receiver components through the internal receiver bus 124, and that an IR interface 150 may be provided on the internal receiver bus 124 to receive commands for the CPU 122 from a remote commander 152.

Figure 5:
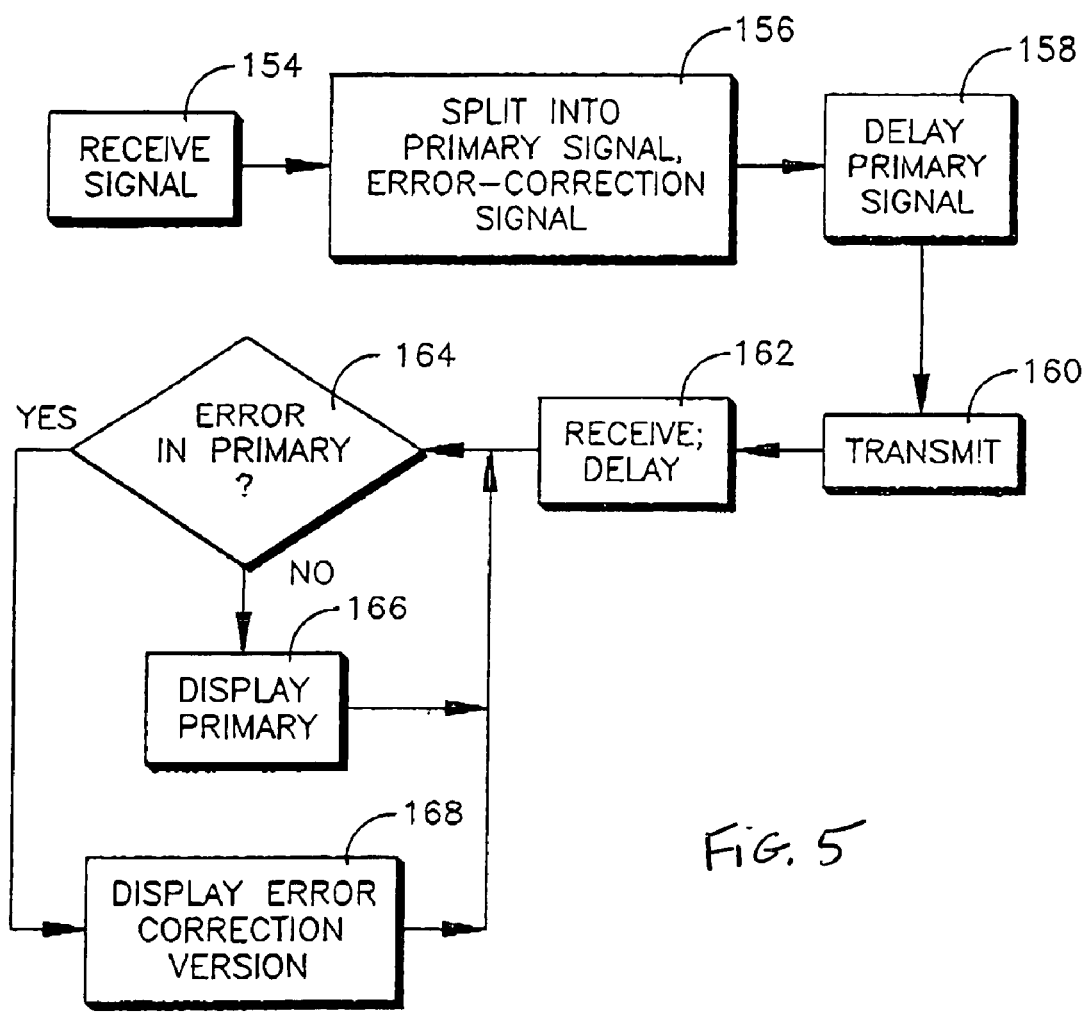
FIG. 5 is a flow chart showing the present logic.

FIG. 5 shows example logic that may be executed by the components above. Commencing at block 154, an input signal is received. Moving to block 156, the input signal is split into a primary signal and an secondary signal. The primary signal may be delayed if desired at block 158, and then both signals are transmitted at block 160.

The signals are received at block 162 and if the primary signal was delayed at block 156, the secondary signal is delayed at block 162. If no errors above a non-zero or zero threshold are detected in the primary signal at decision diamond 164, the primary signal is used to display data at block 166. Otherwise, the secondary signal, which, it will be recalled, was received before the corresponding data in the primary signal, is displayed at block 168. The logic then loops back to decision diamond 164. It is to be understood that when the secondary signal and primary signals are both identical as generated, as is the case in FIGS. 2 and 3, once display has switched to the secondary signal, it need not switch back to the primary signal as soon as the primary signal is error free, but rather can continue displaying the secondary signal until such time as errors are detected in it, at which time the primary signal can be reverted to.

While the particular SYSTEM AND METHOD FOR ERROR CORRECTION IN HIGH DEFINITION TV SIGNAL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

We claim:

1. A system for error correction in a source signal, comprising:

at least one source signal input;

a first path electrically connected to the input and decoding the source signal and sending a decoded signal to a first encoder for generating a primary signal stream;

a second path electrically connected to the input, the second path including a second encoder receiving the source signal and prior to decoding the source signal, processing the source signal to generate an encoded compressed signal stream, the second encoder not receiving signals from or sending signals to the first encoder;

a multiplexer combining the encoded compressed signal stream with the primary signal stream for transmission thereof, whereby lost data in the primary signal stream can be replaced at a receiver by information in the encoded compressed signal stream;

a demultiplexer separating the primary signal stream from the encoded compressed signal stream;

circuitry processing the streams; and logic for displaying information carried in the primary signal stream under a first error condition and otherwise displaying information carried in the encoded compressed stream.

2. The system of claim 1, wherein the source signal is a high definition (HD) TV signal.

3. The system of claim 1, wherein the system transmits on at least one frequency in a spectrum between about 57 GHz and 64 GHz.

4. The system of claim 1, comprising at least one delay in the first path delaying encoding of decoded source signal data relative to the encoding of a compressed version of the same source signal data in the second path.

* * * * *

UNITED STATES PATENT AND TRADEMARK OFFICE
CERTIFICATE OF CORRECTION

| | | |
|---|---|---|
| PATENT NO. | : 7,653,869 B2 | Page 1 of 1 |
| APPLICATION NO. | : 11/062142 | |
| DATED | : January 26, 2010 | |
| INVENTOR(S) | : Kawasaki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1379 days.

Signed and Sealed this

Twenty-third Day of November, 2010

David J. Kappos
*Director of the United States Patent and Trademark Office*